UNITED STATES PATENT OFFICE.

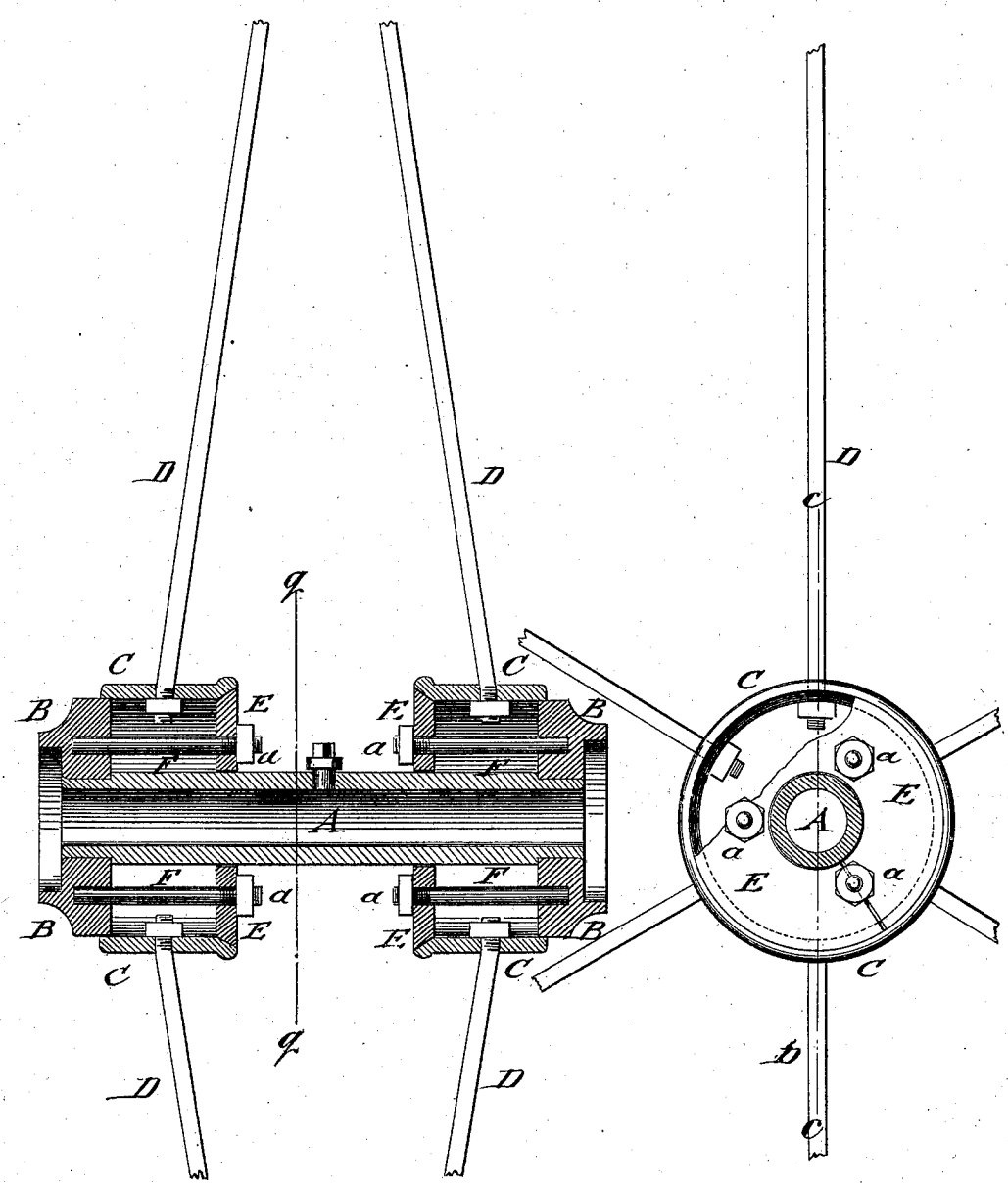

DE LA FAYETTE REMINGTON, OF SILVERTON, OREGON.

IMPROVEMENT IN VEHICLE-WHEELS.

Specification forming part of Letters Patent No. 192,189, dated June 19, 1877; application filed February 26, 1877.

*To all whom it may concern:*

Be it known that I, DE LA FAYETTE REMINGTON, of Silverton, in the county of Marion and State of Oregon, have invented a new and Improved Vehicle-Wheel, of which the following is a specification:

In accompanying drawing, Figure 1 represents a vertical longitudinal section of my vehicle-wheel on line $c\ c$, Fig. 2; and Fig. 2 a vertical transverse section of the same on line $q\ q$, Fig. 1.

Similar letters of reference indicate corresponding parts.

The invention relates to an improved metallic hub for vehicle-wheels, by which the tire may be tightened quickly by the expansion or contraction of the spokes.

The invention will first be described in connection with the drawing, and then pointed out in the claim.

In the drawing, A represents the journal-box, that carries on end shoulders fixed rings or collars B, along the outer circumference of which the spoke-carrying cylindrical sleeves or bands C are moved forward and back. One set of spokes, D, is attached by screw-nuts to the sleeve at one end of the box, while the alternating set of spokes, D, is connected to the sleeve at the other end. The inner ends of the sleeves C are supported on rings E that form a bevel-joint therewith, the inner circumference of the rings E binding tightly on the box A. The inner and outer rings E and A retain the sleeves or bands C tightly in position and keep the fastening-nuts of the spokes firmly locked to the threaded ends of the same on the inside of the bands. A number of bolts, F, are attached to the outer rings B, and run back parallel to the axis of the box A, being extended through the inner rings E, and threaded at their projecting ends for the screw-nuts $a$. By screwing up the nuts $a$ on the bolts F the sleeve or band C is moved over the end ring B, so as to spread the spokes at their inner ends and shorten them and tighten the wheel.

The pressure of the tire exerts a tendency to bring the spokes together, which is controlled and counteracted by the hub portions, that may be readily adjusted to the tire by the expansion or contraction of the spokes.

The hubs and spokes are made of metal, the fellies of wood, the adjustable hub portions establishing the required uniform degree of strain on the spokes and tire, so as to furnish a strong, durable, and readily-adjusted wheel, that may be fitted to any kind of axle.

The rings E are split at one point for the purpose of allowing them to contract and expand and bind by their inner circumferences on the box and firmly gripe the same. This is an important point, as thereby the rings are tightly clamped to the box, and the sleeves prevented from getting loose and shaking, so as to endanger the durability and effectiveness of the hub.

Having thus described my invention, I claim as new and desire to secure by Letters Patent—

The slide sleeves C, adjusted by means of the rings and screw-bolts with respect to the collars B, as and for the purpose specified.

DE LA FAYETTE REMINGTON.

Witnesses:
 AI COOLIDGE,
 J. M. BROWN.